United States Patent
Suzuki et al.

(10) Patent No.: US 6,896,245 B2
(45) Date of Patent: May 24, 2005

(54) STRATIFIED SCAVENGING CARBURETOR

(75) Inventors: Masao Suzuki, Igu-Gun (JP); Hiroshi Nagata, Shibata-Gun (JP); Tetsuji Kojima, Shibata-Gun (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 10/719,519

(22) Filed: Nov. 21, 2003

(65) Prior Publication Data

US 2004/0130039 A1 Jul. 8, 2004

(30) Foreign Application Priority Data

Nov. 27, 2002 (JP) ...................................... 2002-334389

(51) Int. Cl.⁷ ............................................. F02M 23/03
(52) U.S. Cl. ...................... 261/23.2; 261/23.3; 261/52; 261/DIG. 1
(58) Field of Search .............................. 261/23.2, 23.3, 261/52, 65, DIG. 1; 123/579, 583

(56) References Cited

U.S. PATENT DOCUMENTS

| | | | |
|---|---|---|---|
| 2,325,010 A | 7/1943 | Mc Curdy | 261/41.4 |
| 2,941,788 A * | 6/1960 | Braun | 261/23.2 |
| 3,174,469 A | 3/1965 | Rappolt | 123/586 |
| 3,439,658 A | 4/1969 | Simonet | 123/277 |
| 3,967,600 A * | 7/1976 | Iiyama et al. | 261/23.2 |
| 4,060,062 A | 11/1977 | Tsutsui et al. | 261/23.3 |
| 4,073,278 A | 2/1978 | Glenn | 123/198 F |
| 4,094,931 A | 6/1978 | Karino | 261/23.3 |
| 4,182,295 A | 1/1980 | Zeller et al. | 123/586 |
| 4,200,083 A | 4/1980 | Ishida | 123/198 F |
| 4,256,063 A | 3/1981 | Sumiyoshi et al. | 123/184.45 |
| 4,294,205 A | 10/1981 | Iiyama et al. | 123/274 |
| 4,333,429 A | 6/1982 | Iiyama et al. | 123/274 |
| 4,414,162 A * | 11/1983 | Ii et al. | 261/23.2 |
| 4,445,474 A * | 5/1984 | Nakao et al. | 123/336 |
| 4,452,218 A * | 6/1984 | Yokoyama et al. | 123/579 |
| 4,796,579 A | 1/1989 | Wolfe et al. | 123/336 |
| 4,995,370 A * | 2/1991 | Imaeda et al. | 123/583 |
| 5,036,816 A | 8/1991 | Mann | 123/361 |
| 5,088,468 A * | 2/1992 | Imaeda | 123/583 |
| 5,200,118 A | 4/1993 | Hermle | 261/64.6 |
| 5,611,312 A | 3/1997 | Swanson et al. | 123/436 |
| 6,000,683 A | 12/1999 | Van Allen | 261/52 |
| 6,202,989 B1 | 3/2001 | Pattullo | 261/52 |
| 6,328,288 B1 * | 12/2001 | Gerhardy | 261/35 |
| 6,439,547 B1 | 8/2002 | King et al. | 261/52 |
| 6,708,958 B1 * | 3/2004 | Warfel et al. | 261/45 |

FOREIGN PATENT DOCUMENTS

| | | | |
|---|---|---|---|
| DE | 342274 | 10/1921 | |
| DE | 432953 | 8/1926 | |
| DE | 2204192 | 8/1973 | |
| DE | 2909637 | 10/1979 | |
| DE | 3722424 | 1/1988 | |
| EP | 0651142 | 5/1995 | |
| JP | 52-6835 * | 1/1977 | ................ 261/23.2 |
| JP | 57183520 | 11/1982 | |
| JP | 09268918 | 10/1997 | |
| WO | WO 9817902 | 4/1998 | |

* cited by examiner

Primary Examiner—Richard L. Chiesa
(74) Attorney, Agent, or Firm—Reising, Ethington, Barnes, Kisselle, P.C.

(57) ABSTRACT

A stratified scavenging carburetor with a lost motion coupling permits limited relative movement of a throttle valve relative to an air valve so that initial opening of the throttle valve off idle does not open the air valve to avoid diluting with scavenging air the fuel and air mixture delivered to an engine. Rotation of the throttle valve beyond a predetermined amount from idle causes a corresponding opening of the air valve to provide scavenging air to the engine. Closing a choke valve engages a lock lever with the throttle valve to move the throttle valve off idle to a start position without opening the air valve. In another embodiment, closing the choke valve prevents the air valve from opening even if the throttle valve is moved beyond where the throttle valve would cause the air valve to open if the choke valve were open. Thus, a richer than normal fuel and air mixture can be supplied to the engine during a choke-assisted start and warm-up of the engine.

33 Claims, 8 Drawing Sheets

STRATIFIED SCAVENGING CARBURETOR

REFERENCE TO RELATED APPLICATION

Applicants claim priority of Japanese patent application, Ser. No. 2002-344,389, filed Nov. 27, 2002.

FIELD OF THE INVENTION

The present invention relates generally to a carburetor and more particularly to a stratified scavenging carburetor for controlling delivery of a fuel and air mixture and scavenging air to a stratified scavenging 2-stroke engine.

BACKGROUND OF THE INVENTION

In a 2-stroke engine, stratified scavenging arrangements have been used to reduce or prevent the blow-through or loss of fuel through exhaust ports at the time of a fuel and air mixture entering the combustion chamber. Some such arrangements use an air passage that is separate from a fuel and air mixture passage, and scavenging is done with a layer of air provided from the air passage at the outset of scavenging, after which scavenging is done with a fuel and air mixture, and at the same time, new air is taken into a crankcase chamber.

In this stratified scavenging arrangement, the fuel to air mixture ratio within a combustion chamber of the engine can become too lean with the addition of air from the air passage at idle and other low speed and low load engine operating conditions resulting in unstable engine operation under these conditions. Further, for improved starting and warming up of the engine, it can be desirable to provide a somewhat rich fuel and air mixture to the engine. Air flow through the air passage at this time can make the fuel and air mixture leaner than desired resulting in difficulty starting and warming up the engine.

SUMMARY OF THE INVENTION

In one presently preferred embodiment a stratified scavenging carburetor includes a choke valve and a throttle valve rotatably supported relative to an air intake passage to control fluid flow therethrough, a scavenging air passage, an air valve rotatably supported relative to the scavenging air passage to control air flow therethrough, a lock lever carried by the throttle valve and a link providing a lost motion coupling between the throttle valve and the air valve. When the engine is not running, the choke valve is open, the throttle valve is in its idle position and the air valve is closed. Movement of the choke valve to its closed position engages the choke valve with and displaces the lock lever which in turn moves or opens the throttle lever from its idle position without moving the air valve from its closed position. Thus, upon starting the engine, the choke valve and air valve are closed and the throttle valve is opened a desired amount from its idle position to provide a richer than normal fuel and air mixture to the engine to facilitate starting and warming up the engine.

In another presently preferred embodiment a stratified scavenging carburetor includes a choke valve and a throttle valve rotatably supported relative to an air intake passage to control fluid flow therethrough, a scavenging air passage, an air valve rotatably supported relative to the scavenging air passage to control air flow therethrough, and driven for more rotation by the throttle valve during a portion of the rotation of the throttle valve between its idle and wide open position. Movement of the choke valve to its closed position for a choke-assisted start of an engine engages a choke valve lever with a lever of the air valve to prevent the air valve from moving from its closed position even when acted on by the throttle valve. Thus, with the choke valve closed the throttle valve can be rotated to a start position moved from its idle position to provide a richer fuel and air mixture to the engine. Preferably, without opening the air valve, the throttle valve can be rotated beyond the position where it would cause the air valve to open if the choke valve was open.

Some objects, features and advantages of stratified scavenging carburetors as set forth herein include providing a carburetor that delivers to an engine a desired fuel and air mixture over a wide range of operating conditions from idle to wide open throttle engine operation, and starting and warming up of an engine, enables separate control of a throttle valve during a choke assisted start of an engine, automatically sets a throttle valve to a start position upon closing a choke valve, provides an enriched fuel and air mixture to an engine to facilitate starting the engine, permits automatic return of a choke valve from its closed position to its open position, provides a compact carburetor that includes a scavenging air passage, air valve, choke valve and throttle valve, prevents delivery of scavenging air to an engine during a choke assisted start of the engine, enables relative movement between the throttle valve and air valve during at least a portion of the throttle valve movement, is durable, reliable and of economic manufacture and assembly.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
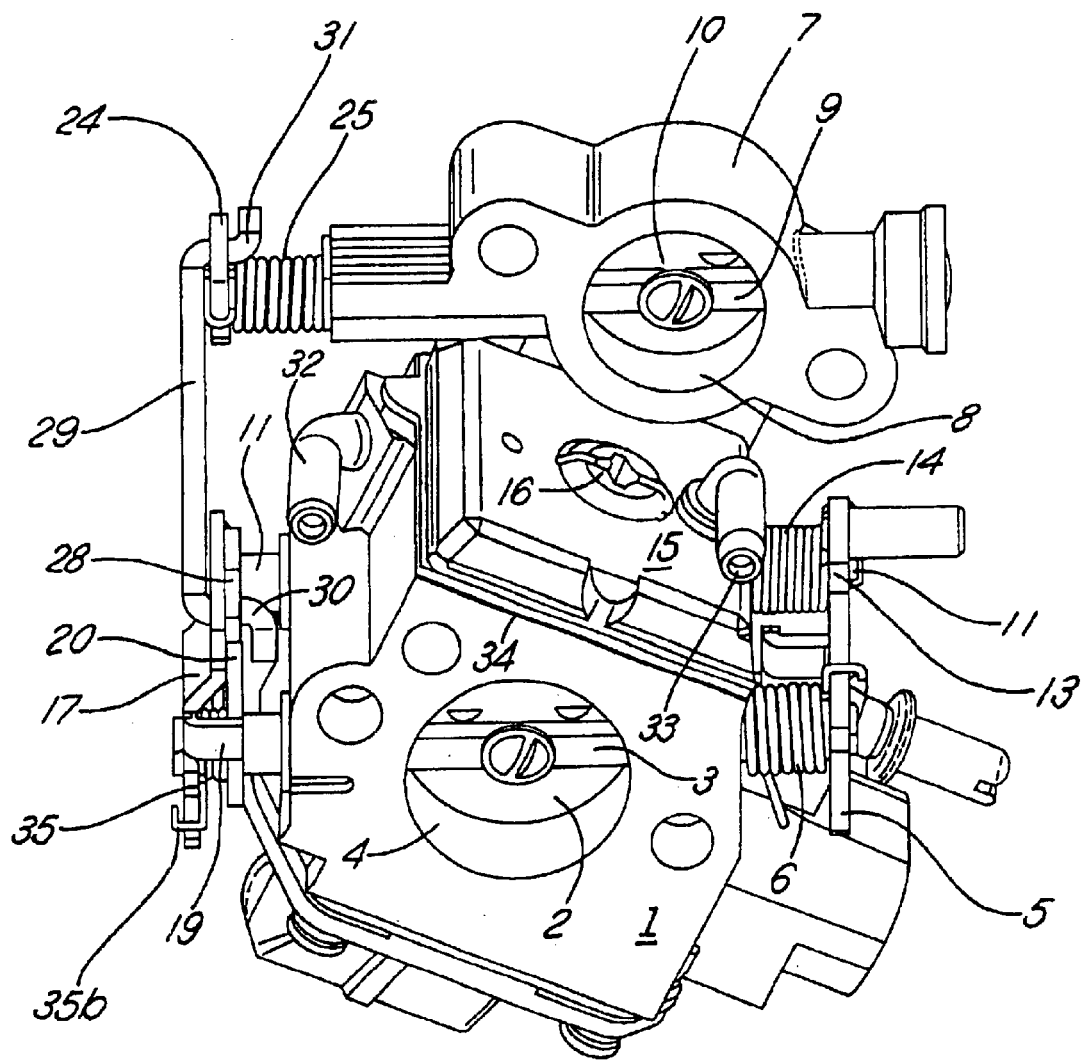
FIG. 1 is a front perspective view of one presently preferred embodiment of a stratified scavenging carburetor.

As shown in FIG. 1, a carburetor body 1 includes an air intake and fuel mixing passage 4 extending through the body 1 and a pump cover 15 carried by the body and securing a diaphragm 34 between the cover 15 and body 1 by a bolt 16. When pressure pulsations of a crankcase chamber of the engine are introduced into a pulsation pressure chamber on the upper side of the diaphragm 34 through a pipe 33, fuel in a fuel tank (not shown) is taken into a pump chamber on the lower side of the diaphragm 34 from a fuel inlet pipe 32, and is supplied to a fuel metering chamber of a substantially constant pressure fuel supply mechanism of the carburetor. Fuel in the fuel metering chamber is preferably supplied to the air intake passage 4 via a low-speed fuel nozzle and a high-speed fuel nozzle for delivery to the engine in a fuel and air mixture. Hence, fuel and air is mixed in the air intake passage which can also be called a fuel and air mixing passage.

A butterfly-type throttle valve includes a throttle valve head 2 rotatably supported on a rear portion or outlet side of the air intake passage 4 by a throttle valve shaft 3. A choke valve includes a choke valve head 12 rotatably supported on the front portion or inlet side of the air intake passage 4 by a choke valve shaft 11. A choke valve operating lever 13 is connected to one end of the choke valve shaft 11, and a return spring 14 that yieldably biases the choke valve head 12 to an open position is wound thereon. One end of the return spring 14 is fastened to or abuts the carburetor body 1 and the other end of the return spring 14 is fastened to or abuts the choke valve operating lever 13. A throttle valve operating lever 5 is connected to one end of the throttle valve shaft 3 and a return spring 6 that yieldably biases the throttle valve 2 to an idle position is wound thereon. One end of the return spring 6 is fastened to or abuts the carburetor body 1 and the other end of the return spring 6 is fastened to or abuts the throttle valve operating lever 5.

A scavenging air control body 7 for supplying scavenging air from an air cleaner (not shown) to a scavenging passage of the engine via an air passage 8 is preferably formed integral with the pump cover 15 or may be formed as part of a plate secured to and defining in part the carburetor body 1. The air passage 8 is preferably approximately parallel to the air intake and fuel mixing passage 4, and is provided in the scavenging air control body 7. An air valve 10 for opening and closing the air passage 8 to control air flow therethrough is supported by an air valve shaft 9. An air valve lever 24 is connected to one end of the air valve shaft 9, as shown in FIG. 1, and a return spring 25 that yieldably biases the air valve 10 toward its closed position is wound on the air valve shaft 9. One end of the return spring 25 is fastened to or abuts the scavenging air control body 7 and the other end of the return spring 25 is fastened to or abuts the air valve lever 24.

Figure 2:
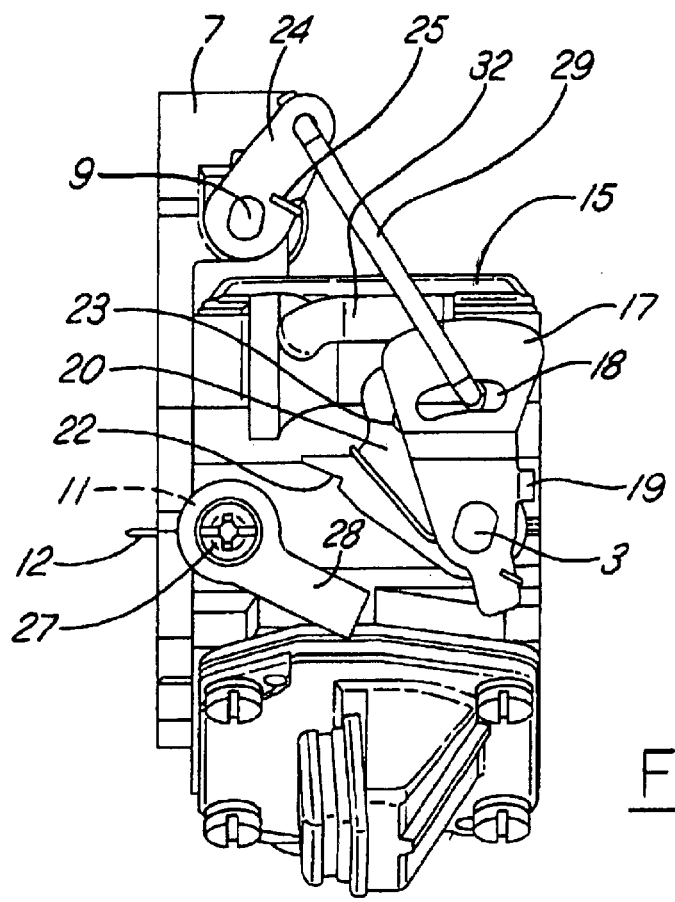
FIG. 2 is a side view of the stratified scavenging carburetor.

A choke lever 28 is secured to one end of the choke valve shaft 11 such as by a bolt 27. As shown in FIG. 2, a throttle valve lever 17 having a bent tab 19 is connected to an end of the throttle valve shaft 3, and a lock lever 20 is loosely rotatably supported on the throttle valve shaft 3. A spring 35 is wound on the throttle valve shaft 3 with one end 35a of the spring 35 fastened to or abutting the lock lever 20 and the other end 35b of the return spring 35 fastened to or abutting the throttle valve lever 17. The lock lever 20 is yieldably biased in a direction moving the lock lever away from the tab 19 by the force of the spring 35 (FIG. 1), and the tab 19 of the throttle valve lever 17 is spaced from the lock lever 20 in normal operation.

The throttle valve lever 17 and the air valve lever 24 are connected by a link 29 that provides a lost motion coupling between the throttle valve lever 17 and the air valve lever 24. Through this lost motion coupling, the air valve 10 is held in its closed position (by the force of spring 25) while the throttle valve head 2 is rotated from its idle position a predetermined amount to a start position. In more detail, an end 30 of the link 29 is slidably received in an arcuate idler groove 18 formed in the throttle valve lever 17 and an arcuate idler groove 23 formed in the lock lever 20. The idler grooves 18 and 23 are generally aligned and disposed at an equal radial distance from the axis of the valve shaft 3. The other end of the link 29 is connected to the air valve lever 24 so as to substantially prevent lateral movement of the link 29, relative to the air valve lever 24. On an edge of the lock lever 20 a shoulder 22 is provided which is engaged with an end of the choke lever 28 when the choke lever 28 is moved to close the choke valve head 12.

Figure 3:
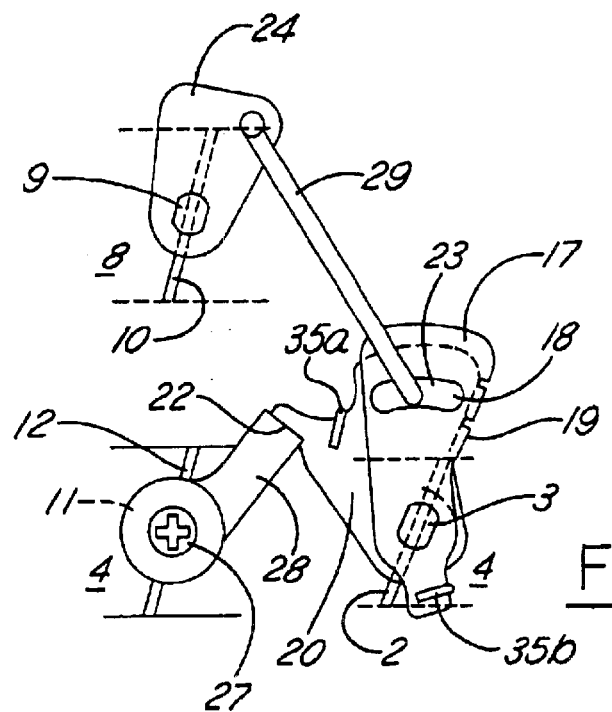
FIG. 3 is a side view of certain components of the carburetor shown in a position for starting of an engine.

As shown in FIG. 3, to perform a cold start of the engine, the choke valve operating lever 13 is displaced to move the choke valve head 12 to its fully closed position. This causes the choke lever 28 to impinge upon and rotate the lock lever 20. During the rotation of the lock lever 20, it comes in contact with the tab 19 of the throttle valve lever 17, and the throttle valve lever 17 is thereby rotated to displace or open the throttle valve head 2 to a start position spaced angularly or rotated from its idle position. When the choke valve head 12 is in its closed position, the choke lever 28 is engaged with and held on the shoulder 22. The air valve 10 is held in its closed position by the force of the spring 25, since the throttle valve lever 17 and lock lever 20 have not been rotated far enough to cause them to bear on and displace the link 29. In other words, during this initial rotation, the throttle valve lever 17 and the lock lever 20 move relative to the link 29 received in the respective idler grooves 18 and 23. In this state, when starting or cranking of the engine is affected, a suitable quantity of fuel in a rich fuel to air mixture is supplied to the engine since the choke valve 12 and the air valve 10 are closed, as shown in FIG. 3, and the throttle valve is opened a desired amount away from its idle position. The rich fuel and air mixture facilitates starting and warming up the engine.

Figure 4:
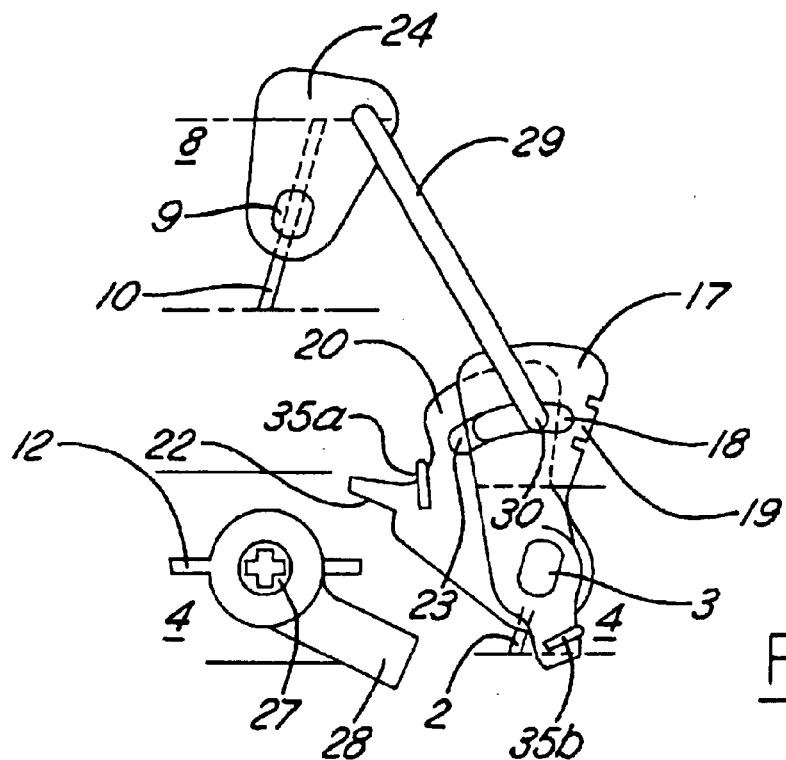
FIG. 4 is a side view of certain components of the carburetor for explaining operation of the stratified scavenging carburetor after the engine has been started.
Figure 7:
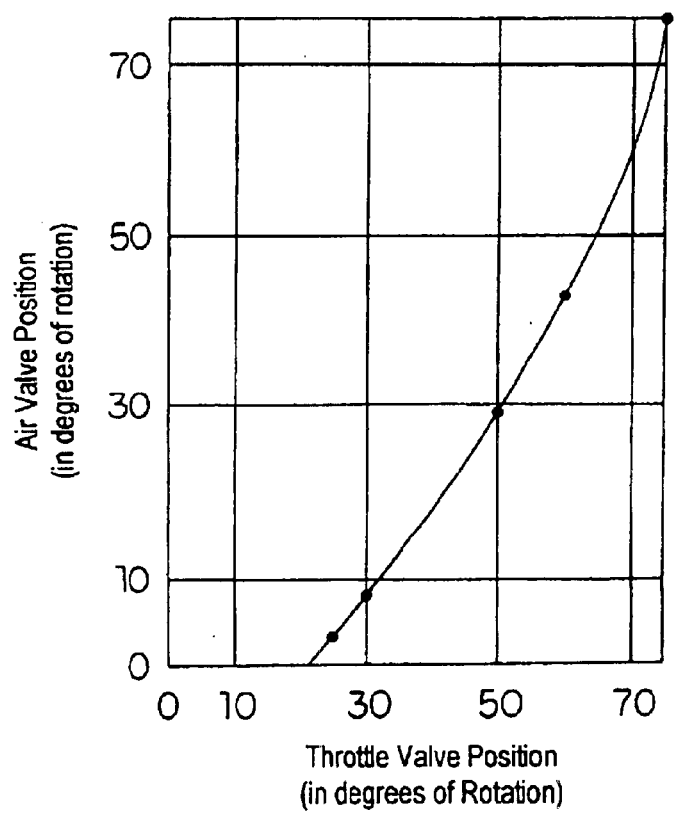
FIG. 7 is a diagram showing the extent to which an air valve of the stratified scavenging carburetor is open in relation to the extent to which a throttle valve is open.

When the engine is warmed-up and the throttle valve head 2 is rotated toward wide open throttle to increase the engine speed and/or power, as shown in FIG. 4, the choke lever 28 is released from the lock lever shoulder 22, and the choke valve head 12 is moved to its fully open position by the force of the spring 14. The desired extent of the lost motion coupling between the throttle valve 2 and the air valve 10 can be different depending on the engine. Generally, it is desirable to permit the throttle valve to move away from idle a certain amount while maintaining the air valve 10 closed to prevent supplying too much air and hence, an undesirably lean fuel and air mixture to the engine during certain low speed and/or low power engine operating conditions. As shown in FIG. 7, in one presently preferred embodiment, the air valve 10 is held at a closed position until the throttle valve head 2 is rotated about 10° to 30°, and is shown here as about 20° away from its idle position to partially open the throttle valve. With further rotation of the throttle valve, the air valve 10 opens to provide through passage 8 a scavenging air supply to the engine.

Figure 5:
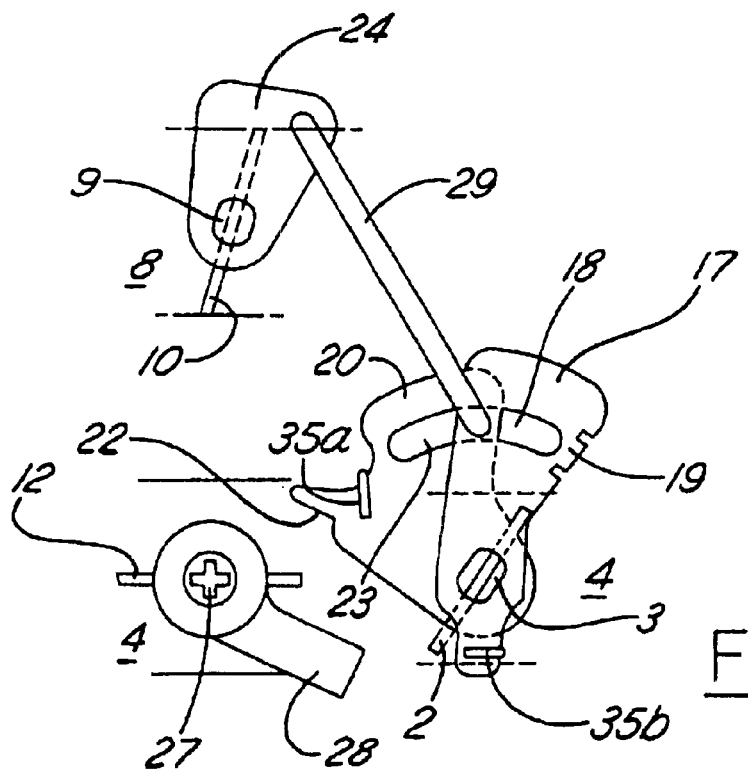
FIG. 5 is a side view of certain components of the carburetor in an intermediate position.
Figure 6:
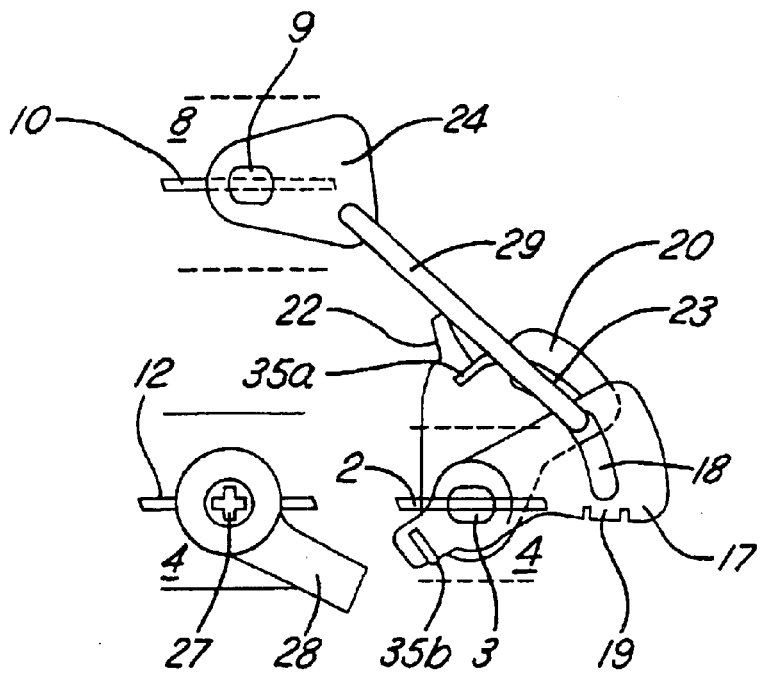
FIG. 6 is a side view of certain components of the carburetor shown in a position corresponding to wide open throttle operation.

In one presently preferred embodiment, this is accomplished by permitting the throttle valve lever 17 to move relative to the link 29 via the groove 18 for an initial portion of the opening of the throttle valve. Thereafter, as shown in FIG. 5, the end 30 of the link 29 comes in contact with the end of the idler groove 18 to begin to open the air valve 10. Desirably, the air valve 10 is fully opened as shown in FIG. 6, when the throttle valve head is in its wide open position. To accomplish this, the air valve may open more rapidly than the throttle valve.

As shown in FIGS. 8–14, another embodiment of a stratified scavenging carburetor 50 also includes an air valve 52 rotatably supported in a scavenging air passage 54 to control air flow therethrough, and throttle and choke valves 56,58 respectively, rotatably supported within an air intake and fuel mixing passage 60 to control fluid flow therethrough. As in the previous embodiment, the throttle valve 56 includes a valve head 62 attached to a throttle valve shaft 64 for rotation with the shaft, and a throttle valve operating lever 66 at one end of the throttle valve shaft 64 which is driven to rotate the throttle valve head 62 relative to the air intake and mixing passage 60. The throttle valve 56 is preferably yieldably biased to its idle position by a spring 68 having one end engaged with the throttle valve operating lever 66 and its other end engaged with the carburetor body 69 or other preferably fixed surface. In the idle position, the throttle valve head 62 restricts fluid flow through the air intake passage 60. The throttle valve is rotatable from its idle position to a wide open throttle position wherein the throttle valve head 62 permits a substantially unrestricted fluid flow through the air intake passage 60. A throttle valve lever 70 is fixed on the end of the throttle valve shaft 64 opposite the throttle valve operating lever 66 for rotation with the throttle valve shaft 64. The throttle valve lever 70 extends at an acute included angle relative to and is preferably perpendicular to the throttle valve shaft 64 and includes a finger 72 spaced from throttle valve shaft 64 and preferably extending generally transversely to the throttle valve lever 70.

Figure 10:
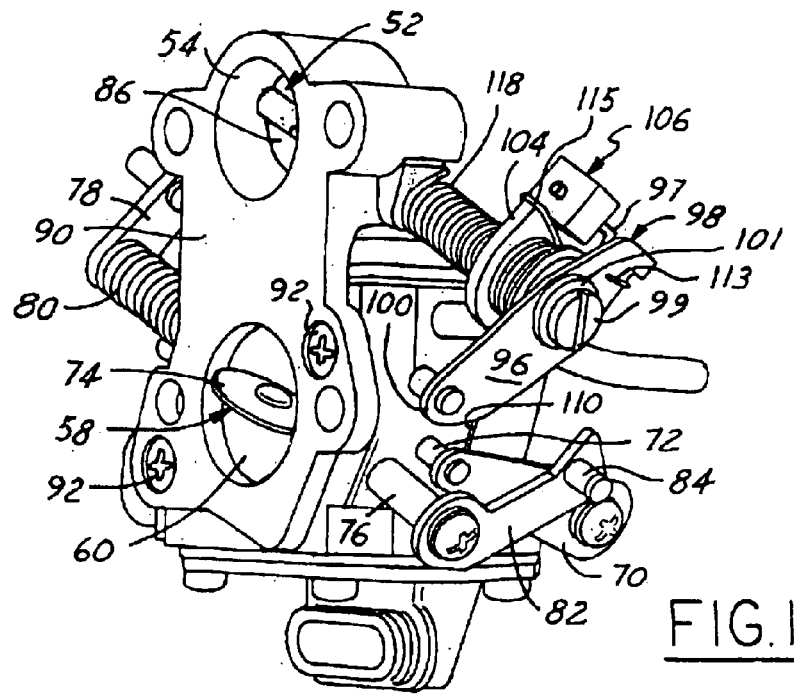
FIG. 10 is another perspective view of the carburetor of FIG. 8 showing a choke valve of the carburetor in its open position.
Figure 14:
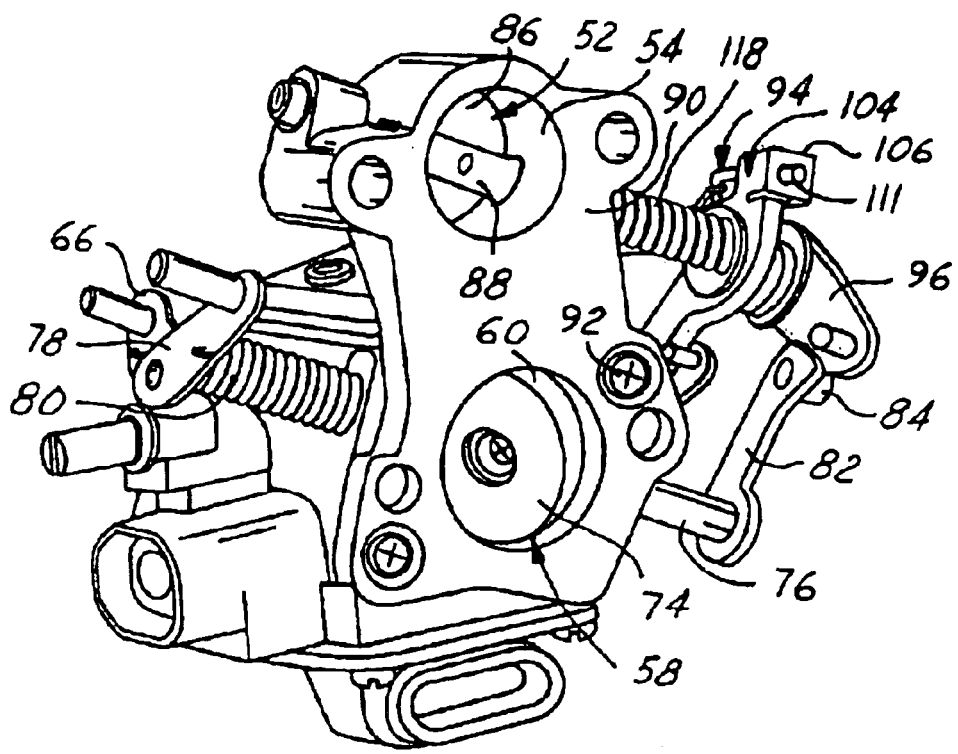
FIG. 14 is a perspective rear view of the carburetor of FIG. 8 with the choke valve and air valve in their closed positions, and the throttle valve in its starting position as in FIG. 13.

As best shown in FIGS. 10 and 14, the choke valve 58, as in the previous embodiment, preferably includes a choke valve head 74 attached to a choke valve shaft 76 that has a choke valve operating lever 78 at one end. The choke valve 58 is preferably yieldably biased to its open position preferably permitting a substantially unrestricted fluid flow therepast, by a spring 80 having one end bearing on the choke valve operating lever 78 and the other end bearing on the carburetor body 69. The choke valve 58 is rotatable from its open position to a closed position substantially restricting fluid flow through the air intake passage 60. A choke valve lever 82 is preferably carried by the choke valve shaft 76 for rotation therewith. The choke valve lever 82 desirably extends at an acute included angle relative to, and is preferably perpendicular to, the choke valve shaft 76 and includes a finger 84 extending therefrom and spaced from the choke valve shaft 76.

The air valve 52 includes an air valve head 86 disposed in the air passage 54 and rotatably carried by an air valve shaft 88 extending through an end plate 90 of the carburetor body 69. The end plate 90 may define in part the air passage 54 as well as the air intake passage 60 and may be fastened to the carburetor main body 69 such as by screws or bolts 92.

A U-shaped stop member 94 is preferably carried by the air valve shaft 88 for rotation therewith, and may be fastened to the air valve shaft 88 to prevent relative rotation between the stop member 94 and the air valve shaft 88. In the embodiment shown, the stop member 94 has a pair of legs 95 joined by a crossbar 97 each with an opening (not shown) through which the air valve shaft 88 is received. The stop member 94 may be keyed to the air valve shaft 88 or may have a non-round opening in at least one leg 95 received on a mating non-round end of the air valve shaft 88 to prevent rotation of the stop member 94 relative to the air valve shaft 88.

A first lever 96 is rotatably carried by the air valve shaft 88 preferably between its ends, and has a first end 98 selectively engagable with the stop member 94, and a second end 100 spaced therefrom. The first lever 96 preferably extends generally transversally to the axis of the air valve shaft 88 and preferably includes a hooked finger 102 adapted to engage the stop member 94. A screw 99 may hold the first lever 96 on the air valve shaft 88 preferably with an annular bearing 101 disposed between the first lever 96 and stop member 94. An air valve operating lever 104 is rotatably carried, preferably between its ends, by the air valve shaft 88. The air valve operating lever 104 preferably extends generally transversely to the air valve shaft 88 and has a first end 106 selectively engagable with the stop member 94 and a second end 108 spaced from the first end 106. The air valve operating lever 104 is preferably received between the stop member legs 95 and preferably has a hub 109 with a through bore in which the air valve shaft 88 is rotatably received. To permit adjustment of the starting position of the air valve operating lever 104, and hence its position relative to the throttle valve lever 70, an adjustment screw 111 is threadedly adjustably received in the lever 104 adjacent the first end 106 and is engagable with the stop member 94. The air valve operating lever 104 includes a cam surface 110 disposed for engagement with the finger 72 of the throttle valve lever 70.

Figure 8:
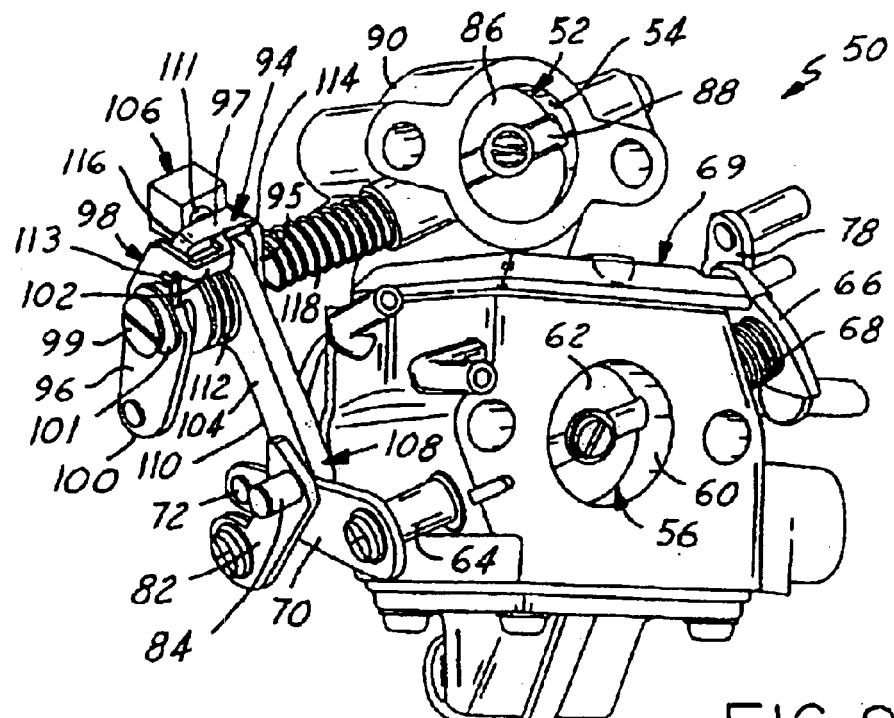
FIG. 8 is a perspective view of a second presently preferred embodiment of a carburetor illustrating an air valve shown in its closed position and a throttle valve shown in its idle position.
Figure 9:
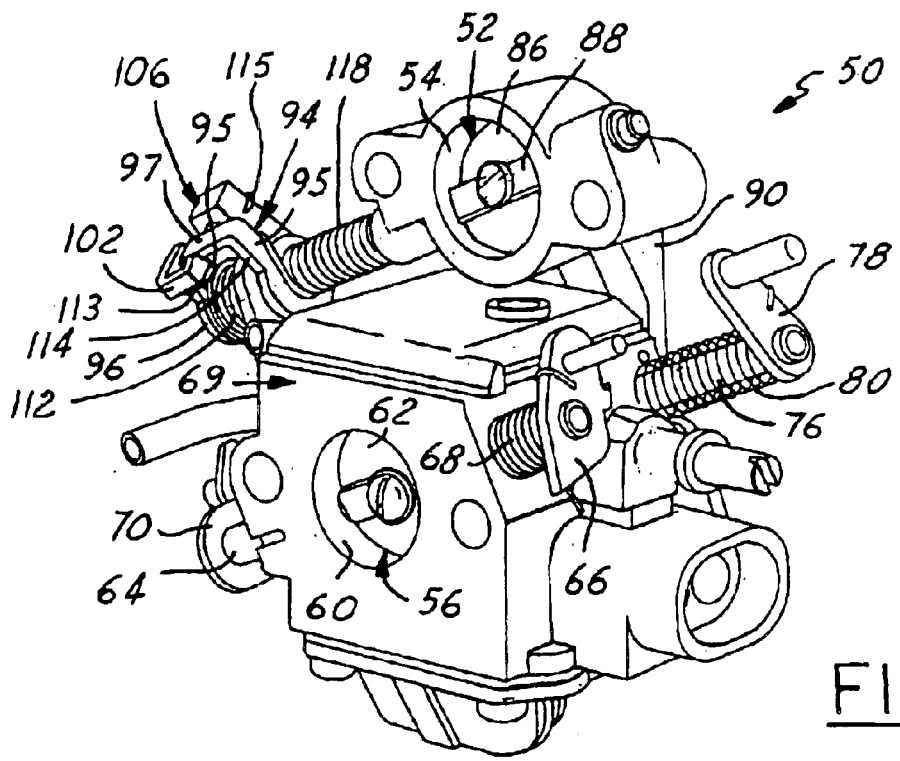
FIG. 9 is another perspective view of the carburetor of FIG. 8.

The first lever 96 and air valve operating lever 104 are both yieldably biased to positions wherein their respective first ends 98, 106 engage opposite sides of the stop member 94 by a spring 112 which has one end 113 engaged with the first lever 96 and its other end 115 engaged with the air valve operating lever 104. The spring 112 is preferably received on the hub 109. As best shown in FIGS. 8 and 9, the first end 98 of the first lever 96 engages one side 114 of the stop member 94 and the first end 106 of the air valve operating lever 104 engages the other side 116 of the stop member 94. Accordingly, the first ends 98, 104 of the first lever 96 and the air valve operating lever 104 are yieldably biased to rotate in opposite directions relative to the air valve shaft 88 so they rotate toward each other and into engagement with opposite sides of the stop member 94. The air valve 52 as a whole is yieldably biased to its closed position by a spring 118 having one end engaged with the stop member 94 and its other end engaged with the end plate 90 or carburetor body 69. In its closed position, the air valve head 86 prevents or substantially prevents air flow through the air passage 54.

Figure 11:
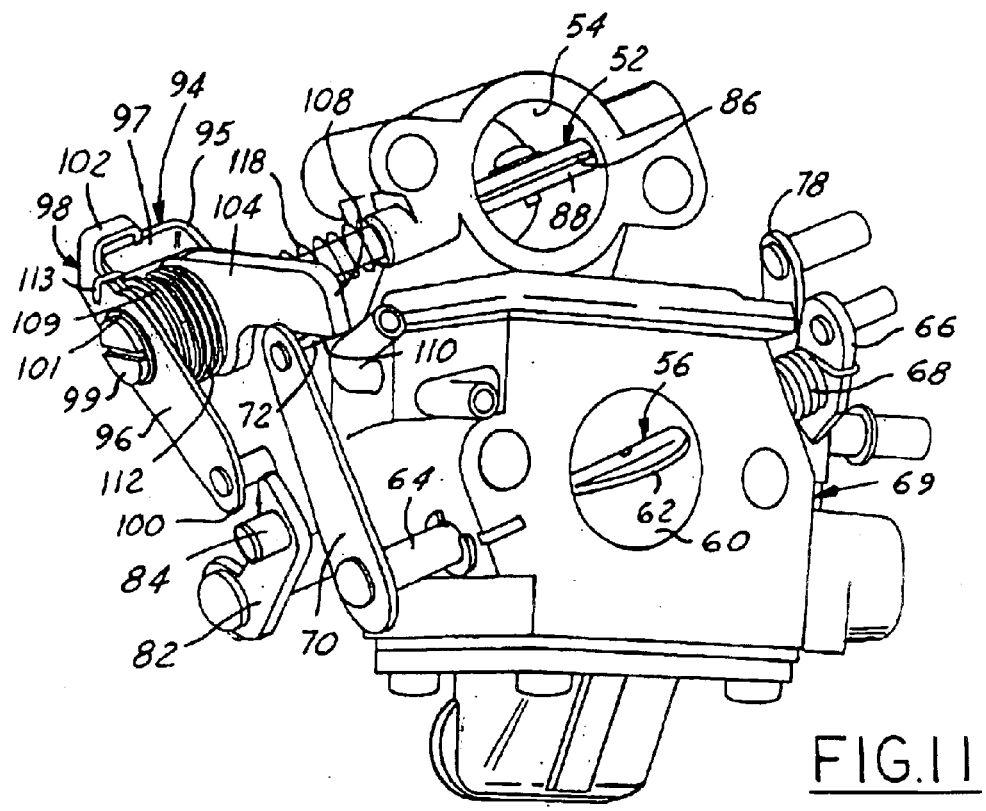
FIG. 11 is a perspective view of the carburetor of FIG. 8 illustrating the air valve and throttle valve in their wide open positions.

In operation, a fuel and air mixture is supplied to an engine through the air intake and mixing passage 60, and scavenging air is supplied to the engine via the scavenging air passage 54. As shown in FIGS. 8–10, in normal operation, at idle, the choke valve 58 is in its open position, the air valve 52 is in its closed position and the throttle valve 56 is in its idle position permitting a limited fuel and air flow through the air intake passage 60 into the engine. The finger 72 of the throttle valve lever 70 is spaced from the air valve operating lever 104. As the throttle valve 56 is moved sufficiently off idle towards its wide open throttle position to increase the engine's speed and/or power, the throttle valve lever 70 is rotated and eventually its finger 72 engages and displaces the air valve actuating lever 104 to cause a corresponding movement of the air valve 52 towards its open position as shown in FIG. 11. This lost motion coupling of the throttle valve 56 and air valve 52 permits limited movement of the throttle valve 56 without any movement of the air valve 52. When the air valve 52 opens, the first lever 96, air valve operating lever 104 and air valve shaft 88 all rotate together with the spring 112 maintaining the first lever 96 and air valve operating lever 104 in contact with the stop member 94. Hence, the force of the spring 112 is preferably greater than the force required to rotate the air valve shaft 88 or the air valve operating lever 104 will separate from the stop member 94 and the opening of the air valve will be affected. Desirably, the air valve 52 opens at a faster rate than the throttle valve 56, so that even though the throttle valve 56 begins to open sooner than the air valve 52, both the throttle valve 56 and air valve 52 reach their wide open positions at approximately the same time. This can be accomplished through, for example, appropriate design of the cam surface 110 on the air valve actuating lever 104 and its interaction with the throttle valve lever 70. Accordingly, as in the first embodiment carburetor, the throttle valve 56 is opened a predetermined distance from its idle position prior to opening the air valve 52, and thereafter, the air valve 52 opens with continued opening of the throttle valve 56.

Figure 12:
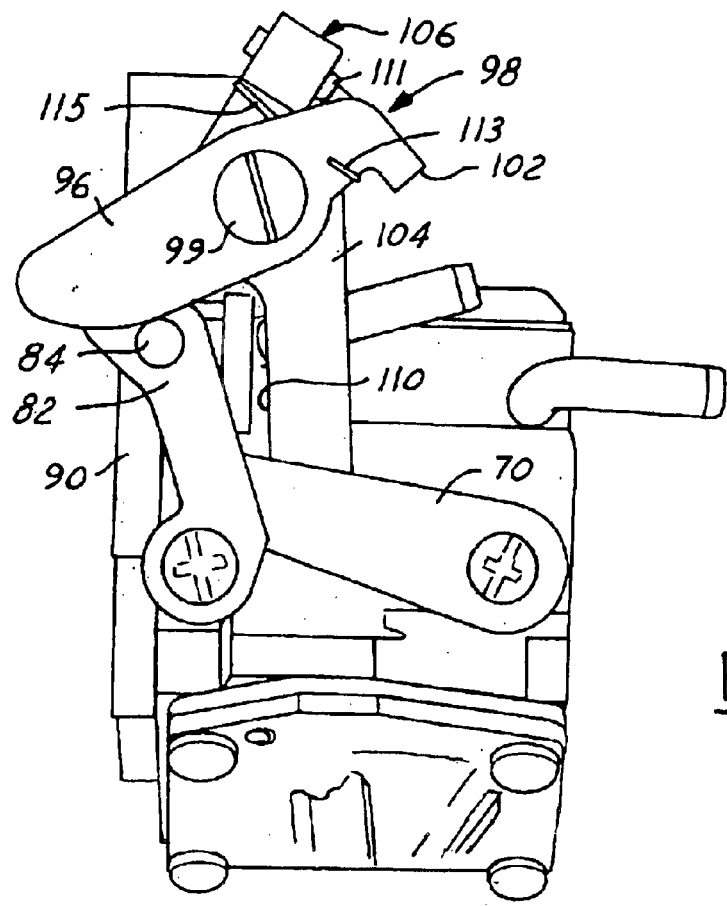
FIG. 12 is a perspective side view of the carburetor of FIG. 8 illustrating various levers of the carburetor when the choke valve is in its closed position, the air valve is in its closed position and the throttle valve is in its idle position.
Figure 13:
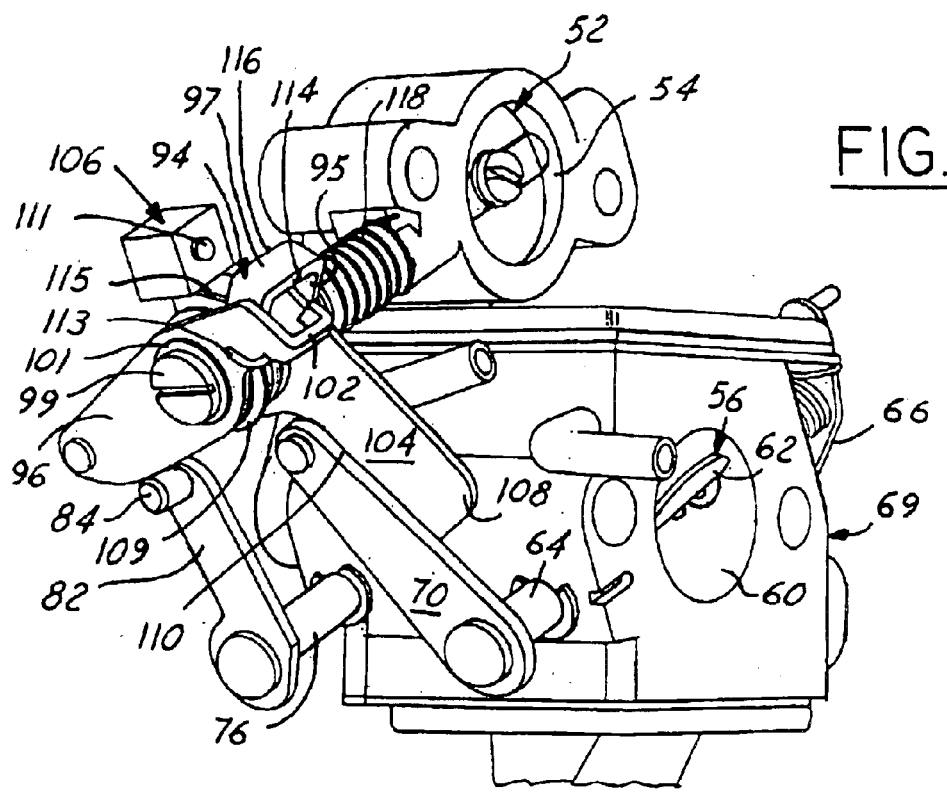
FIG. 13 is a perspective side view of the carburetor of FIG. 8 illustrating the levers when the choke valve is in its closed position, and the throttle valve is moved to it starting position.

To provide a choke assisted start of an engine, such as to start a cold engine, the choke valve 58 is moved from its open position to its closed position through movement of the choke valve operating lever 78. As best shown in FIGS. 12 and 13, this movement of the choke valve 58 causes a corresponding movement of the choke valve lever 82 and causes its finger 84 to engage and displace the first lever 96 rotatably carried by the air valve shaft 88. More specifically, the finger 84 extending from and carried by the choke valve lever 82 engages the first lever 96 and displaces it against the bias of the spring 112 so that the first end 98 is disengaged from the stop member 94. As shown in FIG. 13, the throttle valve 56 can then be moved to a start position, with the throttle valve 56 moved away from its idle position a desired amount. As best shown in FIG. 13, the rotation of the throttle valve 56 to its start position can cause the throttle valve lever 70 to engage and displace the air valve actuating lever 104. However, since the first lever 96 is held against rotation by the choke valve lever 82, movement of the air valve actuating lever 104 merely rotates the first end 106 of the air valve actuating lever 104 away from the stop member 94 against the bias of the spring 112, and does not move or open the air valve 52. Hence, the throttle valve 56 can be open to a desired starting position to enrich the fuel and air mixture delivered to the engine without opening the air valve 52. This prevents air from flowing through the scavenging air passage 54 and thereby reducing the richness of the fuel and air mixture delivered to the engine. Accordingly, a richer than normal fuel and air mixture can be delivered to the engine to facilitate starting and warming it up.

After the engine is started, the choke valve 58 can be returned to its open position by manually rotating the choke valve lever 82, or by an automatic return of the choke valve 58 to its open position as a function of the throttle valve 56 travel towards its wide open throttle position. In one embodiment, this can be accomplished by providing the spring 112 with a spring force, when the air valve actuating lever 104 is sufficiently rotated by the throttle valve lever 70, that is greater than the force holding the choke valve 58 in its closed position. The spring force would then displace the first lever 96 so that its first end 98 moves towards the stop member 94 and releases the first lever 96 from the choke valve lever 82 so that the choke valve 58 can return to its open position via the force of the spring 80 acting on the choke valve 58. The choke valve 58 and throttle valve 56 could also be linked together such that movement of the throttle valve 56 passed a predetermined position towards wide open throttle moves the choke valve 58 from its closed position and thereafter permits the choke valve 58 to open thorough the force of the spring 80 acting on the choke valve 58.

Accordingly, in normal operation the air valve 52 opens as a function of the throttle valve opening when the throttle valve 56 is moved a predetermined distance from its idle position. In a choke assisted start and warming up of the engine, the air valve 52 is prevented from opening by engagement of the choke valve lever 82 with the first lever 96 to prevent supplying scavenging air to the engine and thereby reducing the richness of the fuel and air mixture delivered to the engine combustion chamber. This enables a richer than normal fuel and air mixture to be delivered to the engine to facilitate starting and warming up the engine. When the choke valve 58 is moved to its open position, the throttle valve 56 and air valve return 52 to their normal operation to provide a desired fuel and air mixture ratio to the engine throughout its range of operation from idle to wide open throttle.

What is claimed is:

1. A carburetor, including:
   a carburetor body having a scavenging air passage and an air intake passage formed therein;
   an air valve disposed in communication with the scavenging air passage and moveable between closed and open positions to control air flow through the scavenging air passage, and an air valve operating lever carried by the air valve for rotation with the air valve;
   a choke valve disposed in communication with the air intake passage and moveable between an open position permitting a substantially unrestricted fluid flow therethrough and a closed position restricting fluid flow through the air intake passage, and a choke valve lever carried by the choke valve for rotation with the choke valve;
   a throttle valve disposed in communication with the air intake passage and moveable between an idle position restricting fluid flow through the air intake passage and a wide open position permitting a substantially unrestricted fluid flow therethrough, and a throttle valve lever carried by the throttle valve shaft and coupled to the air valve operating lever by a lost motion coupling enabling limited movement of the throttle valve relative to the air valve during at least a portion of the movement of the throttle valve between its idle and wide open positions, said choke valve lever being arranged so that when the choke valve is closed the throttle valve can be moved away from its idle position while the air valve remains closed so that a rich fuel and air mixture can be delivered from the carburetor.

2. The carburetor of claim 1 wherein said lost motion coupling includes a slot formed in one of the air valve lever and throttle valve lever, a link connected to one of the air valve lever and throttle valve lever and slidably received in said slot in the other of the air valve lever and throttle valve lever.

3. The carburetor of claim 1 wherein said throttle valve lever is generally aligned with the air valve operating lever and spaced from the air valve operating lever when the throttle valve is in its idle position and the air valve is in its closed position providing said lost motion coupling wherein during a portion of the movement of the throttle valve from its idle position to its wide open position the throttle valve lever engages and displaces the air valve operating lever to move the air valve from its closed position toward its open position.

4. The carburetor of claim 1 which also includes a lock lever carried by the throttle valve, capable of rotation relative to the throttle valve, and selectively engageable with the choke valve lever and the throttle valve lever so that when the choke valve is moved to its closed position the lock lever displaces the throttle valve lever to move the throttle valve away from its idle position to a start position.

5. The carburetor of claim 4 wherein the throttle valve lever includes a tab generally aligned with the lock lever and engaged by the lock lever when the choke valve engages and displaces the lock lever to move the throttle valve to its start position.

6. The carburetor of claim 4 wherein the choke valve is yieldably biased toward its open position so that movement of the lock lever away from the choke valve lever enables the choke valve to return to its open position.

7. The carburetor of claim 2 wherein the slot is formed in the throttle valve lever and the link is connected to the air valve lever so that initial movement of the throttle valve lever away from its idle position causes relative movement between the throttle valve lever and the link until the throttle valve lever engages the link and further movement of the throttle valve causes a corresponding displacement of the air valve through the link.

8. The carburetor of claim 1 wherein the air valve includes a first lever rotatably carried by the air valve shaft, a stop member carried by the air valve shaft for rotation with the air valve shaft, and at least one spring yieldably biasing one end of the first lever and one end of the air valve operating lever into engagement with the stop member, movement of the choke valve to its closed position engages the choke valve lever with the first lever and displaces said one end of the first lever from the stop member permitting the air valve operating lever to rotate relative to the air valve shaft when the throttle valve lever engages the air valve operating lever during opening of the throttle valve.

9. The carburetor of claim 8 wherein when the air valve is moved toward its open position, the air valve shaft, first lever and air valve operating lever rotate in the same direction.

10. The carburetor of claim 8 wherein the choke valve lever displaces the first lever in a direction of rotation opposite to the direction of rotation of the air valve shaft when the air valve is moved toward its open position.

11. A carburetor, including:
a carburetor body having a scavenging air passage and an air intake passage formed therein;
an air valve disposed in communication with the scavenging air passage and having an air valve shaft rotatably carried by the carburetor body, an air valve head carried by the air valve shaft for rotation with the air valve shaft between closed and open positions to control air flow through the scavenging air passage, and an air valve operating lever carried by the air valve shaft for rotation with the air valve shaft;
a choke valve disposed in communication with the air intake passage and having a choke valve shaft, a choke valve head carried by the shaft for movement between an open position permitting a substantially unrestricted fluid flow therethrough and a closed position restricting fluid flow through the air intake passage, and a choke valve lever carried by the choke valve shaft for rotation with the choke valve shaft;
a throttle valve disposed in communication with the air intake passage and having a throttle valve shaft, a throttle valve head carried by the throttle valve shaft for movement between an idle position restricting fluid flow through the air intake passage and a wide open position permitting a substantially unrestricted fluid flow therethrough, and a throttle valve lever carried by the throttle valve shaft and coupled to the air valve operating lever by a lost motion coupling enabling movement of the throttle valve away from its idle position a predetermined amount without moving the air valve from its closed position with continued movement of the throttle valve beyond said predetermined amount moving the air valve toward its open position as a function of the continued movement of the throttle valve toward its wide open position; and
a lock lever rotatably carried by the throttle valve shaft, selectively engageable with the choke valve lever, and selectively engageable with the throttle valve lever so that movement of the choke valve to its closed position engages the choke valve lever with the lock lever and causes the lock lever to engage the throttle valve lever to displace the throttle valve to a start position spaced from its idle position an amount less than said predetermined amount without moving the air valve from its closed position thereby providing an enriched fuel and air mixture to the engine compared to the fuel and air mixture delivered to the engine when the throttle valve is in its idle position.

12. The carburetor of claim 11 wherein said lost motion coupling includes a slot formed in one of the air valve lever and throttle valve lever, a link connected to one of the air valve lever and throttle valve lever and slidably received in said slot in the other of the air valve lever and throttle valve lever.

13. The carburetor of claim 12 wherein the slot is formed in the throttle valve lever and the link is connected to the air valve lever so that initial movement of the throttle valve lever away from its idle position causes relative movement between the throttle valve lever and the link until the throttle valve lever engages the link and further movement of the throttle valve causes a corresponding displacement of the air valve through the link.

14. The carburetor of claim 11 wherein the lock lever includes a shoulder engageable by the choke valve lever when the choke valve is moved to its closed position to hold the choke valve in its closed position and the throttle valve in its start position.

15. The carburetor of claim 14 wherein the choke valve is yieldably biased toward its open position so that movement of the lock lever away from the choke valve lever enables the choke valve to return to its open position.

16. The carburetor of claim 17 wherein the throttle valve lever includes a tab generally aligned with the lock lever and engaged by the lock lever when the choke valve engages and displaces the lock lever to move the throttle valve to its start position.

17. The carburetor of claim 11 wherein the air valve lever and throttle valve lever are constructed and arranged so that the air valve lever is in its fully open position when the throttle valve lever is in its wide open position.

18. The carburetor of claim 17 wherein the air valve lever opens at a faster rate than the throttle valve lever during at least a portion of the movement of the throttle valve lever.

19. The carburetor of claim 13 which also includes a slot formed in the lock lever that is spaced equally from the throttle valve shaft as the slot in the throttle valve lever permitting relative movement between the lock lever and the link.

20. A carburetor, including:

a carburetor body having a scavenging air passage and an air intake passage formed therein;

an air valve disposed in communication with the scavenging air passage and having an air valve shaft rotatably carried by the carburetor body, an air valve head carried by the air valve shaft for rotation with the air valve shaft between closed and open positions to control air flow through the scavenging air passage, and an air valve operating lever rotatably carried by the air valve shaft;

a choke valve disposed in communication with the air intake passage and having a choke valve shaft, a choke valve head carried by the shaft for movement between an open position permitting a substantially unrestricted fluid flow therethrough and a closed position restricting fluid flow through the air intake passage, and a choke valve lever carried by the choke valve shaft and engageable with the air valve when the air valve is closed and the choke valve is moved to its closed position to hold the air valve in its closed position; and a throttle valve disposed in communication with the air intake passage and having a throttle valve shaft, a throttle valve head carried by the throttle valve shaft for movement between an idle position restricting fluid flow through the air intake passage and a wide open position permitting a substantially unrestricted fluid flow therethrough, and a throttle valve lever carried by the throttle valve shaft and engageable with the air valve operating lever during at least a portion of the movement of the throttle valve between its idle and wide open positions so that when the choke valve is open engagement of the throttle valve with the air valve operating lever moves the air valve toward its open position as a function of the continued movement of the throttle valve toward its wide open position, and when the choke valve is closed, continued rotation of the throttle valve lever beyond its engagement with the air valve operating lever rotates the air valve operating lever relative to the air valve shaft without moving the air valve from its closed position.

21. The carburetor of claim 20 wherein the air valve includes a first lever rotatably carried by the air valve shaft, a stop member carried by the air valve shaft for rotation with the air valve shaft, and at least one spring yieldably biasing one end of the first lever and one end of the air valve operating lever into engagement with the stop member, and wherein movement of the choke valve to its closed position engages the choke valve lever with the first lever and displaces said one end of the first lever from the stop member permitting the air valve operating lever to rotate relative to the air valve shaft when the throttle valve lever engages the air valve operating lever during opening of the throttle valve.

22. The carburetor of claim 21 wherein the first lever and air valve operating lever rotate in planes generally perpendicular to the axis of the air valve shaft.

23. The carburetor of claim 21 wherein said one end of the first lever engages one side of the stop member and said one end of the air valve actuating member engages an opposite side of the stop member.

24. The carburetor of claim 21 wherein when the air valve is moved toward its open position, the air valve shaft, first lever and air valve operating lever rotate in the same direction.

25. The carburetor of claim 21 wherein the choke valve lever displaces the first lever in a direction of rotation opposite to the direction of rotation of the air valve shaft when the air valve is moved toward its open position.

26. The carburetor of claim 21 wherein a spring is disposed between the first lever and air valve actuating lever with one end of the spring bearing on the first lever and the other end of the spring bearing on the air valve operating lever to bias the first lever and air valve operating lever in opposed rotational directions and into engagement with opposite sides of the stop member.

27. The carburetor of claim 21 which also includes an adjustment member carried by the air valve operating member adjacent to said one end engageable with the stop member, the position of the adjustment member being adjustable relative to the air valve operating lever and engageable with the stop member to permit adjustment of the position of the air valve operating lever relative to the stop member.

28. The carburetor of claim 20 which also includes a spring having one end bearing on the air valve and its other end bearing on the carburetor body to bias the air valve toward its closed position.

29. The carburetor of claim 28 wherein the air valve includes a stop member carried by the air valve shaft for rotation with the air valve shaft and said one end of the spring bears on the stop member.

30. The carburetor of claim 20 wherein the air valve is carried by a plate secured to and defining in part the carburetor body and the scavenging air passage.

31. The carburetor of claim 21 which also includes a spring having one end bearing on the stop member and its other end bearing on the carburetor body to bias the air valve toward its closed position.

32. The carburetor of claim 20 wherein the air valve lever includes a cam surface engageable by the throttle valve lever and oriented relative to the throttle valve lever so that when the throttle valve is in its wide open position the air valve is in its fully open position.

33. The carburetor of claim 32 which also includes a finger carried by the throttle valve lever and oriented to engage the cam surface of the air valve operating lever during at least a portion of the movement of the throttle valve from its idle to its wide open positions, said finger sliding relative to the air valve operating lever during at least a portion of the engagement of the finger and cam surface to control the movement of the air valve as a function of the movement of the throttle valve.

* * * * *

UNITED STATES PATENT AND TRADEMARK OFFICE
CERTIFICATE OF CORRECTION

PATENT NO. : 6,896,245 B2
DATED : May 24, 2005
INVENTOR(S) : Masao Suzuki et al.

It is certified that error appears in the above-identified patent and that said Letters Patent is hereby corrected as shown below:

Column 8,
Lines 35, 40 and 47, delete "moveable" and insert -- movable --.
Line 63, delete "one" and insert -- the other --
Line 65, delete "other" and insert -- one --.

Column 10,
Line 38, delete "one" and insert -- the other --.
Line 40, delete "other" and insert -- one --.

Column 11,
Line 5, delete "equally".
Line 6, delete "as" and insert -- equally with --.
Line 27, after "valve" (first occurrence) insert -- operating lever --.

Column 12,
Lines 5 and 6, delete "engages" and insert -- is engageable with --.

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,896,245 B2
DATED : May 24, 2005
INVENTOR(S) : Masao Suzukil

It is certified that error appears in the above-identified patent and that said Letters Patent is hereby corrected as shown below:

<u>Title page,</u>
Item [75], Inventors, should read -- Masao Suzuki, Igu-Gun (JP); Hiroshi Nakata, Shibata-Gun (JP); Tetsuji Kojima, Shibata-Gun (JP) --.

Signed and Sealed this

Twenty-first Day of February, 2006

JON W. DUDAS
*Director of the United States Patent and Trademark Office*